(12) United States Patent
Kondo

(10) Patent No.: US 6,254,963 B1
(45) Date of Patent: Jul. 3, 2001

(54) HONEYCOMB STRUCTURE AND ITS PRODUCTION PROCESS

(75) Inventor: Tosiharu Kondo, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/293,146

(22) Filed: Apr. 16, 1999

(30) Foreign Application Priority Data

Apr. 16, 1998 (JP) .................................................. 10-124271

(51) Int. Cl.[7] ...................................................... B32B 3/12
(52) U.S. Cl. ............................. 428/116; 428/118; 501/9; 501/119; 502/527.19
(58) Field of Search ................................ 428/116, 118; 264/631; 501/9, 119; 502/527.19

(56) References Cited

U.S. PATENT DOCUMENTS 4,833,115    5/1989  Koschlig et al. .
5,258,150  * 11/1993  Merkel et al. ......................... 264/631
5,733,352  *  3/1998  Ogawa et al. ......................... 428/116

FOREIGN PATENT DOCUMENTS 3-102237    10/1991  (JP) .
07080977     3/1995  (JP) .
7-163822     5/1995  (JP) .

* cited by examiner

Primary Examiner—Francis J. Lorin
(74) Attorney, Agent, or Firm—Pillsbury Winthrop LLP

(57) ABSTRACT

The present invention provides a honeycomb structure that is able to suppress separation of a loaded catalyst layer much better than the prior art, and its production process. This honeycomb structure is made in the form of honeycombs partitions having for their main component cordierite having a chemical composition of 45–55 wt % $SiO_2$, 33–42 wt % $Al_2O_3$ and 12–18 wt % MgO, and fifty or more pores (number/1.65 $mm^2$) having a mean diameter of 1–20 μm are provided in the surfaces of the partitions.

3 Claims, 5 Drawing Sheets

SAMPLE E1 (×400)

SAMPLE E2 (×400)

SAMPLE C3 (×400)

US 6,254,963 B1

HONEYCOMB STRUCTURE AND ITS PRODUCTION PROCESS

BACKGROUND OF THE INVENTION

1. Field of the Invention

The present invention relates to a honeycomb structure, made of cordierite, used for the catalyst support of an exhaust gas purification apparatus of an internal combustion engine, and to its production process.

2. Description of the Related Art

Hitherto, a honeycomb structure provided with a plurality of cells in which partitions made of cordierite and so forth were arranged in the form of honeycombs was used as a catalyst support of exhaust gas purification apparatuses. An exhaust gas purification function is demonstrated by loading an exhaust gas purification catalyst on the surfaces of the partitions of this honeycomb structure.

However, the above-mentioned honeycomb structure of the prior art has problems such as those indicated below.

Namely, accompanying the tightening of automobile exhaust gas controls in recent years, studies have been conducted for changing the mounting location of the catalyst support to a location closer to the engine than in the prior art for the purpose of more rapidly activating the catalyst of the exhaust gas purification apparatus. The object of this is to activate the catalyst more rapidly by raising the exhaust gas temperature that comes in contact with the catalyst to a higher temperature than in the prior art (by 50–100° C. as compared with the prior art).

Although this increase in exhaust gas temperature accelerates catalyst activation, on the other hand, it also increases susceptibility of separation of the catalyst layer from the catalyst support. In addition, if separation of the catalyst layer occurs, it has a significant effect on the durability of the exhaust gas purification apparatus. Consequently, there has been a need to develop a honeycomb structure that is able to suppress separation of the catalyst layer even at high temperatures.

In consideration of the problems of the prior art as described above, the present invention provides a honeycomb structure that is able to suppress separation of the loaded catalyst layer much better than the prior art, and its production process.

SUMMARY OF THE INVENTION

The present invention is a honeycomb structure made by providing, in the form of honeycombs, partitions having for their main component cordierite having a chemical composition of 45–55 wt % $SiO_2$, 33–42 wt % $Al_2O_3$ and 12–18 wt % MgO; wherein, fifty or more pores (number/1.65 $mm^2$) having a mean diameter of 1–20 $\mu m$ are provided in the surfaces of said partitions.

DESCRIPTION OF THE PREFERRED EMBODIMENTS

Figure 1:
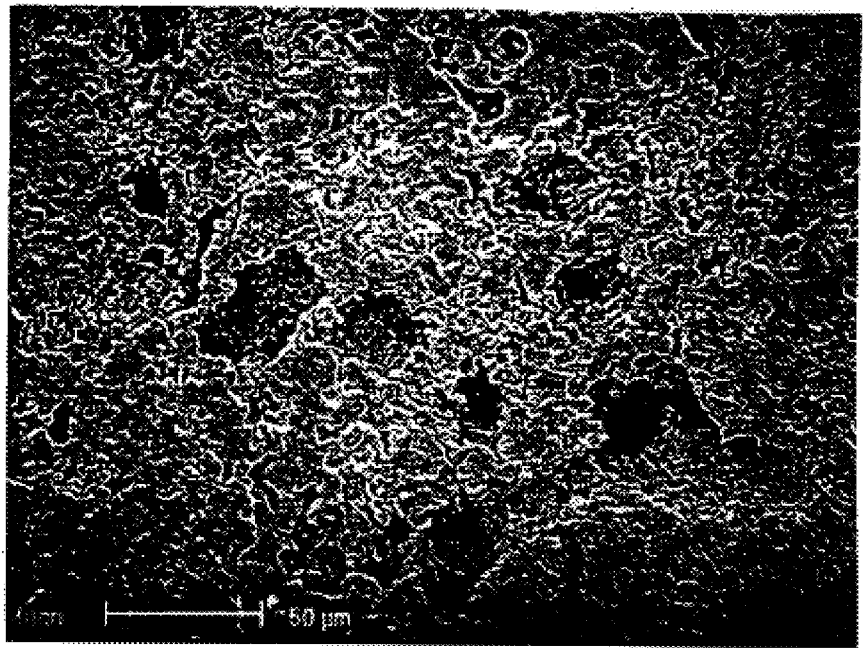
FIG. 1 is an SEM micrograph (×400) showing the structure of a partition surface of sample E1 in Example 1.

What is most noteworthy in the present invention is the providing of 50 or more pores (number/1.65 $mm^2$) having a mean diameter of 1–20 $\mu m$ in the surfaces of the above-mentioned partitions.

If the mean diameter of the pores in the above-mentioned partition surfaces is less than 1 $\mu m$, it becomes difficult for the particles that compose the catalyst layer to enter the pores thereby resulting in the problem of being unable to form the anchor to be described later. On the other hand, if the mean diameter of the pores exceeds 20 $\mu m$, the anchor that is formed is too large thus resulting in the problem of poor thermal expansion characteristics of the partitions. Here, the mean diameter of the above-mentioned pores refers to the mean value of the maximum pore diameter and minimum pore diameter per one pore. For example in the case each pore has an oval shape, the mean value of the maximum diameter and the minimum diameter is taken to be the mean pore diameter.

In addition, if the number of the above-mentioned pores in the above-mentioned partition surfaces is less than 50 (number/1.65 $mm^2$), there is the problem of being unable to sufficiently obtain the anchoring effect to be described later. On the other hand, it is preferable that the upper limit of the number of the above-mentioned pores (number/1.65 $mm^2$) be 1000 in consideration of maintaining the strength of the partition surfaces.

As described above, the honeycomb structure of the present invention provides only the above-mentioned specific number of pores having the above-mentioned specific pore diameter in the partition surfaces. Consequently, separation of a catalyst layer loaded on the partition surfaces of the honeycomb structure can be suppressed considerably more than in the prior art.

Namely, in the case of loading a catalyst on the surfaces of the above-mentioned partitions, together with a catalyst layer being formed on the partition surfaces, a portion of the catalyst layer enters the above-mentioned pores resulting in the formation of a protruding anchor. This anchor demonstrates a so-called anchoring effect that prevents the catalyst layer from separating from the partitions.

In the present invention, this anchor is formed corresponding to the pore diameter and number of the above-mentioned pores, and is smaller and in a larger number than in the prior art. Consequently, the above-mentioned anchor is able to improve anchoring effects more than in the prior art without impairing the durability of the honeycomb structure. Even when the difference in thermal expansion between the above-mentioned catalyst layer and the above-mentioned partitions becomes large, particularly at high temperatures, the adhered state between the catalyst layer and partitions can be maintained by the above-mentioned small-diameter and numerous anchors.

Thus, according to the present invention, a honeycomb structure can be obtained that can considerably suppress separation of a loaded catalyst layer much more than in the prior art.

Next, as a process for producing the above-mentioned excellent honeycomb structure, for example, in addition to incorporating talc in a cordierite raw material, its mean particle diameter is decreased. More specifically, it is preferable that the mean particle size of the talc be 7 μm or less. As a result, a large number of the above-mentioned pores of a specific size can be formed in the partition surfaces.

The following provides an explanation of a different process.

Namely, after adding binder and water to cordierite raw material and kneading, the mixture is extruded, dried and fired to produce a honeycomb structure in which partitions are provided in the form of honeycombs having for their main ingredient cordierite chemically composed of 45–55 wt % $SiO_2$, 33–42 wt % $Al_2O_3$ and 12–18 wt % MgO, wherein the above-mentioned cordierite raw material contains 5–15 parts by weight per 100 parts by weight of the cordierite raw material of combustible particles having a particle size of 1–5 μm.

What is most noteworthy in the present production process is that the above-mentioned cordierite raw material contains only the above-mentioned specified amount of the above-mentioned combustible particles having the above-mentioned specified particle size.

If the particle size of the above-mentioned combustible particles is less than 1 μm, there is the problem of the coating material being unable to penetrate into the pores formed in the partition surfaces. On the other hand, if the particle size exceeds 5 μm, the coating material penetrates into the above-mentioned pores in clumps resulting in the problem of it being, on the contrary, easier for the catalyst layer to separate.

In addition, if the amount of the above-mentioned combustible particles added to the cordierite raw material is less than 5 parts by weight, there is the problem that the number of pores formed in the partition surfaces is too small. On the other hand, if the amount added exceeds 15 parts by weight, the problem results in which the number of the above-mentioned pores conversely is too great.

In the present production process, a cordierite raw material is used in which combustible particles having the above-mentioned specified particle size are added in the above-mentioned specified amount. Consequently, the combustible particles are burned away during firing after kneading, molding and drying and, together with pores being formed, those pores are easily controlled to the desired pore diameter and quantity. Namely, the pores obtained in the surfaces of the partitions can be adjusted within a range of a mean pore diameter of 1–20 μm and a quantity of 50 or more (number/1.65 mm²).

Thus, according to the present production process, the above-mentioned excellent honeycomb structure can be easily obtained.

In addition, sawdust, bread crumbs, foaming agents and various other combustible substances can be used for the above-mentioned combustible particles. Carbon particles are particularly preferable. As a result, combustible particles of the above-mentioned specified particle size can be relatively easily obtained thereby making it possible to reduce production cost.

Although the following provides a description of examples of the present invention, these examples should not be interpreted to limit the present invention in any way.

EXAMPLE 1

The following provides an explanation of a honeycomb structure and its production process as claimed in a first example of the present invention using FIGS. 1 through 7.

Figure 6:
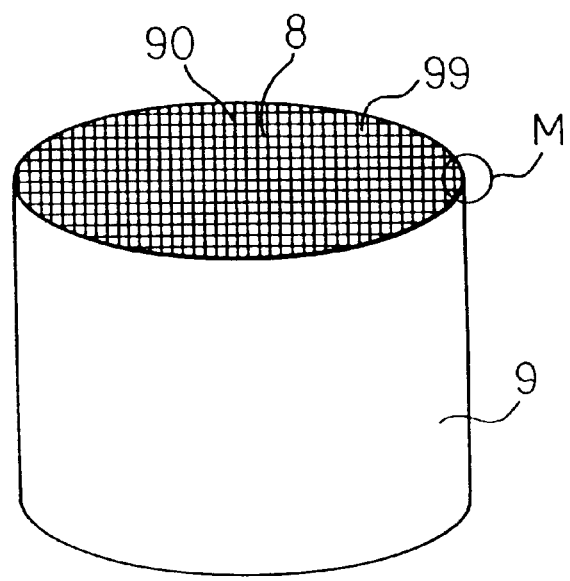
FIG. 6 is a perspective view showing the appearance of a honeycomb structure.
Figure 7:
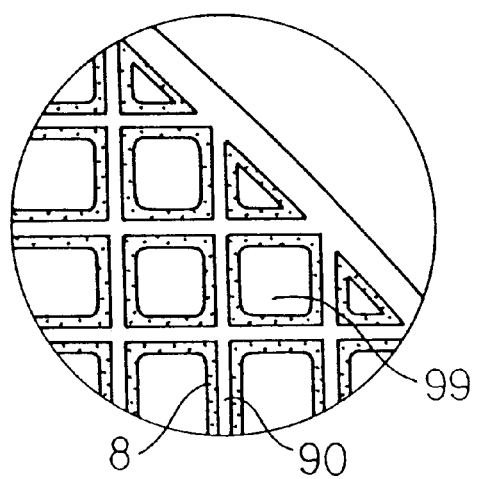
FIG. 7 is an enlarged plan view of section M in FIG. 6.

As shown in FIGS. 6 and 7, the honeycomb structure of the present example is a honeycomb structure in which a large number of cells 99 are provided in the form of honeycombs by arranging partitions 90 having for their main component cordierite having a chemical composition of 45–55 wt % $SiO_2$, 33–42 wt % $Al_2O_3$ and 12–18 wt % MgO. Fifty or more (number/1.65 mm²) pores having a mean pore diameter of 1–20 μm are provided in the surfaces of partitions 90.

In addition to fabricating two kinds of honeycomb structures as examples of the present invention having the above-mentioned constitution (Samples E1 and E2), one kind of honeycomb structure as a conventional example was fabricated (Sample C3) followed by evaluation of the excellent characteristics of the present invention.

To begin with, in the production of Sample E1 as an example of the present invention, each cordierite raw material was prepared as shown in Tables 1 and 2. As can be seen from these tables, in addition to cordierite raw materials comprising kaolin, aluminum hydroxide, alumina and talc in the amounts shown in Table 1, the honeycomb structure of Sample E1 is made by adding thereto 15 parts by weight of combustible particles in the form of carbon particles having a mean particle size of 1 μm. In addition, the mean particle size of the talc is reduced to 7 μm.

TABLE 1

| Raw Material | | Sample E1 (Present Invention) | | Sample E2 (Present Invention) | | Sample C3 (Control) | |
| --- | --- | --- | --- | --- | --- | --- | --- |
| | | Mean particle size (μm) | Content (parts by weight) | Mean particle size (μm) | Content (parts by weight) | Mean particle size (μm) | Content (parts by weight) |
| Cordier- | Kaolin | 3–8 | 45 | 3–8 | 45 | 3–8 | 45 |
| ite | Alumina | 3 | 20 | 3 | 20 | 3 | 20 |
| raw | Talc | 7 | 35 | 7 | 35 | 15 | 35 |
| material | Carbon particle | 1 | 15 | — | 0 | — | 0 |
| Binder Lubricant | Methyl cellulose | — | 5 | — | 5 | — | 5 |
| | Glycerin | — | 3 | — | 3 | — | 3 |
| Water | | — | 25 | — | 25 | — | 25 |

TABLE 2

| Raw Material | Composition (wt %) | | | | | |
|---|---|---|---|---|---|---|
| | SiO$_2$ | MgO | Al$_2$O$_3$ | Al(OH)$_3$ | Fe$_2$O$_3$ | CaO + Na$_2$O + K$_2$O |
| Kaolin | 45.20 | 0.07 | 38.20 | — | 0.78 | 0.50 |
| Alumina | 0.01 | — | 99.50 | — | 0.01 | 0.23 |
| Talc | 62.75 | 31.44 | 0.09 | — | 0.11 | 0.38 |

After mixing binder in the form of methylcellulose, lubricant in the form of glycerin and water in the prescribed amounts (Table 1) into the above-mentioned cordierite raw material and kneading, the resulting mixture is extruded into a honeycomb shape using a mold for honeycomb molding. Next, after drying the molded honeycomb-shaped intermediate, it is cut to prescribed dimensions and fired.

Firing is performed under conditions of heating to 1400° C. at the rate of about 1° C./minute, maintaining this temperature for 5 hours and then cooling to room temperature. After firing, the honeycomb structure is completed. This is designated as Sample E1.

Next, in the production of Sample E2 as another example of the present invention, with the exception of not adding carbon particles as shown in Table 1, cordierite raw material having a composition similar to Example E1 was used. Thus, reducing the mean particle size of the talc to 7 μm is the same as Sample E1. Other conditions were the same as in the case of Sample E1.

Next, in the production of Sample C3 as a conventional example, with the exception of not adding carbon particles and using talc having a mean particle size of 15 μm as indicated in Table 1, cordierite raw material was used having the same composition as Sample E1. Other conditions were the same as in the case of Sample E1.

Figure 2:
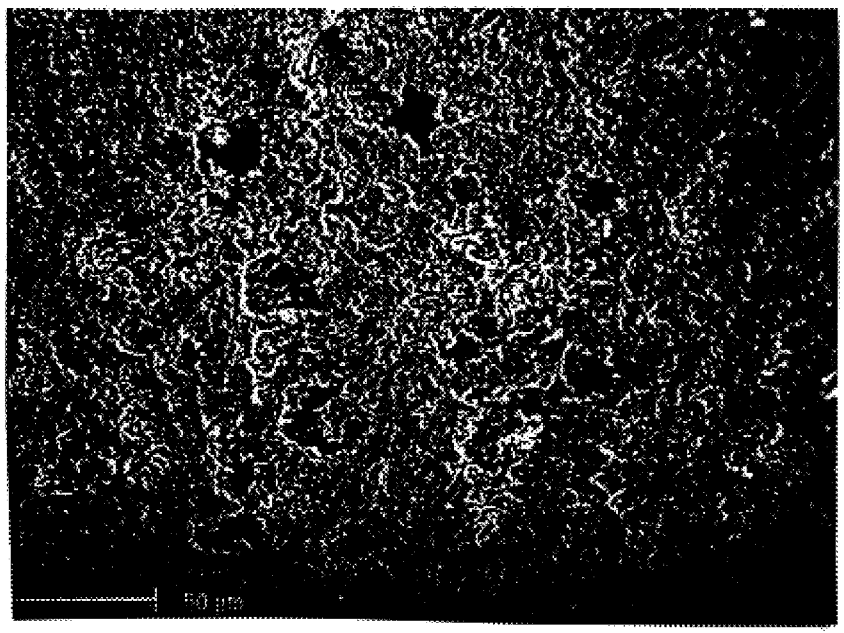
FIG. 2 is an SEM micrograph (×400) showing the structure of a partition surface of sample E2 in Example 1.
Figure 3:
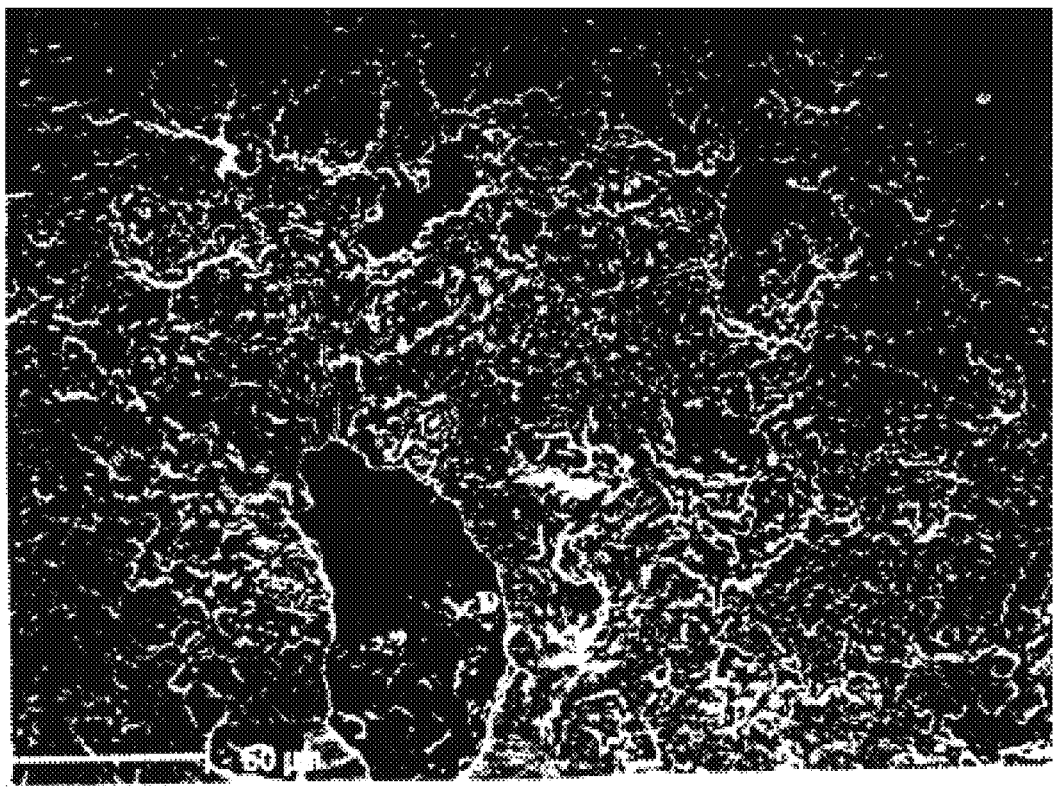
FIG. 3 is an SEM micrograph (×400) showing the structure of a partition surface of sample C3 in Example 1.

Next, the pore distribution in the partition surfaces of the resulting Samples E1, E2 and C3 were observed using an SEM. To begin with, the SEM micrographs (magnification: ×400) are shown in FIGS. 1 through 3. FIG. 1 is an SEM micrograph of the partition surfaces of Sample E1, FIG. 2 is that of the partition surfaces of Sample E2, and FIG. 3 is that of the partition surfaces of Sample C3.

Based on these micrographs, it can be seen that the pores gradually become larger in the order of Sample E1, E2 and C3, while the number of small pores decreases.

Next, in order to perform a more quantitative evaluation, the distribution of mean pore diameter and the number of pores was measured in detail. More specifically, SEM micrographs (×400) were taken at three locations of the partition surfaces, and the pore diameter and number of pores present in these three SEM micrographs were measured. Here, the surface area covered by the three SEM micrographs is 1.65 mm$^2$.

Figure 4:
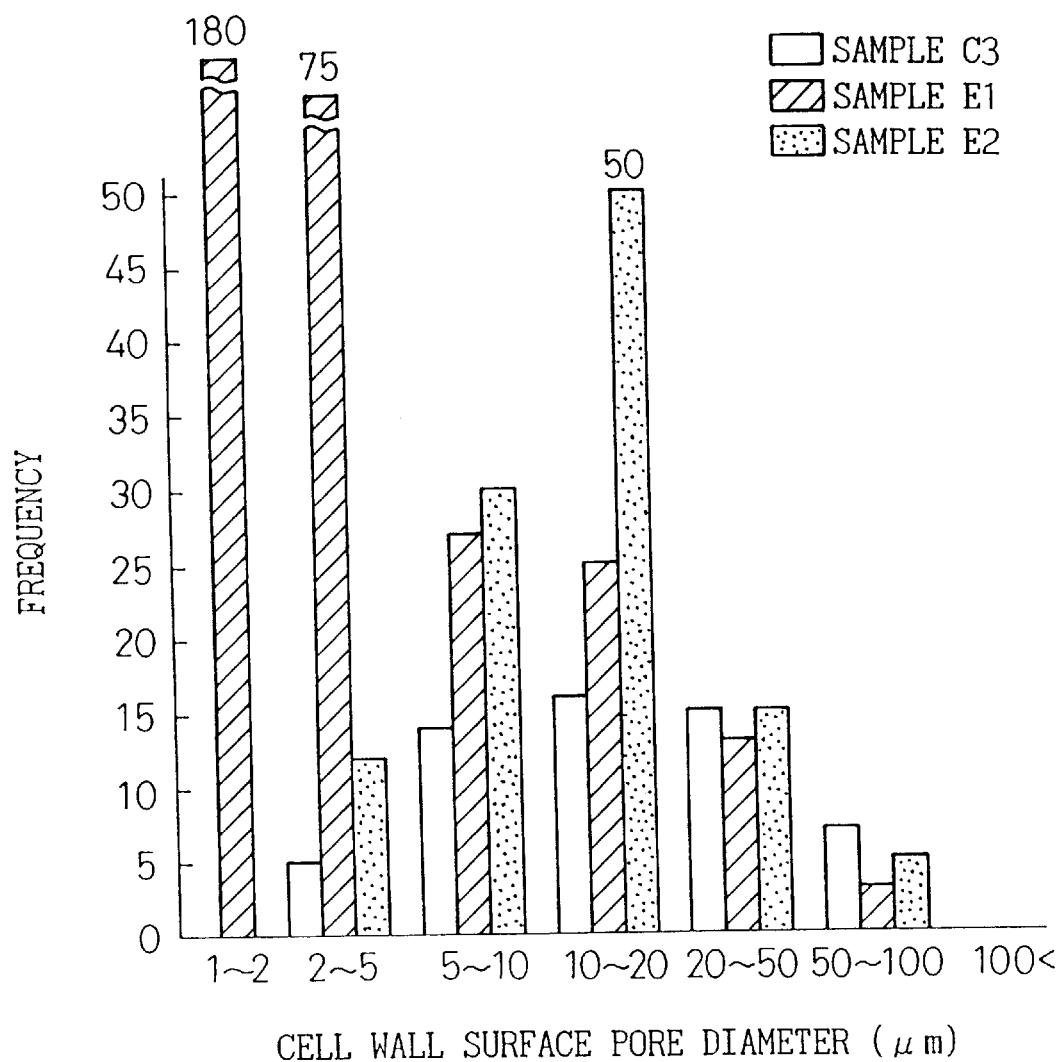
FIG. 4 is a graph showing the state of pore diameter distribution in a partition surface in Example 1.

Measurement results are shown in Table 3 and FIG. 4. In FIG. 4, the ranges of pore diameter are plotted on the horizontal axis, while frequency is plotted on the vertical axis.

As can be determined from Table 3 and FIG. 4, Sample E1 exhibited a peak at the range of a pore diameter distribution of 1–2 μm, and the average pore diameter was 5.5 μm. In addition, the number of pores having a mean pore diameter of 1–20 μm was 307 (number/1.65 mm$^2$).

Sample E2 exhibited a peak at the range of a pore diameter of 10–20 μm, and the average pore diameter was 12.5 μm. In addition, the number of pores having a mean pore diameter of 1–20 μm was 92 (number/1.65 mm$^2$).

On the other hand, Sample C3 exhibited a peak at the range of a pore diameter of 10–20 μm, and the average pore diameter was 23.0 μm. In addition, the number of pores having a mean pore diameter of 1–20 μm was only 35 (number/1.65 mm$^2$).

TABLE 3

| | Sample No. | | |
|---|---|---|---|
| Pore Size Range (μm) | E1 | E2 | C3 |
| 1–2 | 180 | 0 | 0 |
| 2–5 | 75 | 12 | 5 |
| 5–10 | 27 | 30 | 14 |
| 10–20 | 25 | 50 | 16 |
| 20–50 | 13 | 15 | 15 |
| 50–100 | 3 | 5 | 7 |
| 100 or more | 0 | 0 | 0 |
| Total for 1–20 | 307 | 92 | 35 |
| Total no. of pores | 323 | 112 | 57 |
| Average pore diameter | 5.5 | 12.7 | 23.0 |

Next, a catalyst (reference numeral 8 in FIGS. 6 and 7) was loaded onto the partition surfaces of the above-mentioned Samples E1, E2 and C3, and a test was conducted to evaluate separation of that catalyst layer. The loaded catalyst was γ-alumina. More specifically, γ-alumina was formed into a slurry and impregnated into the honeycomb followed by firing at 700° C. to load the catalyst onto the partitions of each sample at a thickness of 20 μm.

Next, the test was conducted by installing each sample in the exhaust system of a gasoline engine having a displacement of 2000 cc, and allowing exhaust gas at a temperature of 800° C. to flow through the exhaust system for 200 hours. Each sample was then subjected to ultrasonic vibrations to promote separation of the catalyst layer following testing.

The amount of separation was evaluated according to the value of: (initial weight of each sample (g)/weight after testing (g))×100 (%).

Figure 5:
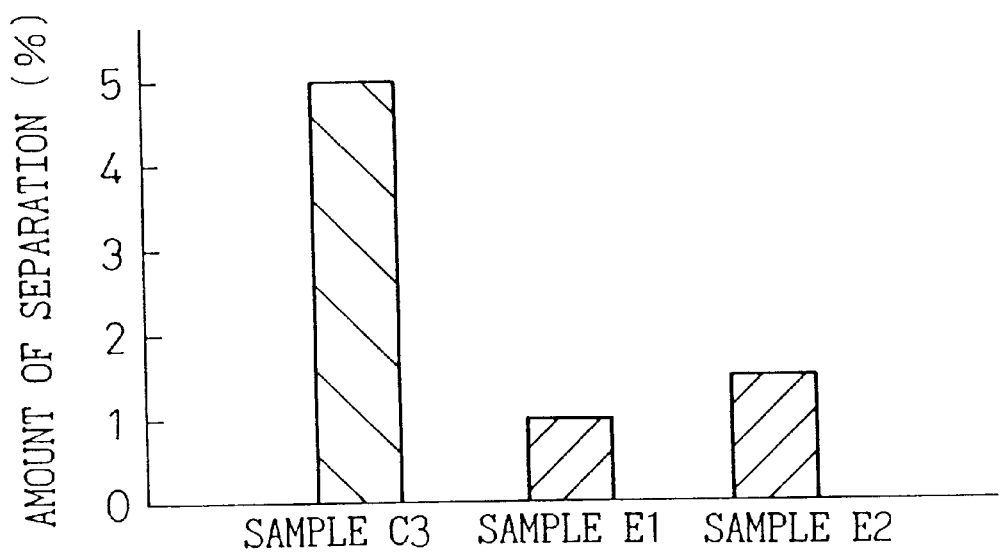
FIG. 5 is a graph showing the results of an adhesion evaluation test in Example 1.

Evaluation results are shown in FIG. 5. In this graph, the type of sample is plotted on the horizontal axis, while the amount of separation (%) is plotted on the vertical axis.

As can be understood from the graph, although the amount of separation reached 5% for conventional sample C3, the amounts of separation for Samples E1 and E2 of the present invention were both less than 2%. The amount of separation for Sample E1 of the present invention in particular was only 1%, indicating extremely satisfactory results.

Based on these results, providing of 50 or more (number/1.65 mm$^2$) pores having a mean pore diameter of 1–20 μm in the surfaces of partitions is able to significantly suppress separation of a catalyst layer loaded onto a honeycomb structure.

What is claimed is:

1. A honeycomb structure made by providing, in the form of honeycombs, partitions having for their main component cordierite having a chemical composition of 45–55 wt % SiO$_2$, 33–42 wt % Al$_2$O$_3$ and 12–18 wt % MgO; characterized in that fifty or more pores (number/1.65 mm$^2$) having a mean diameter of 1–20 μm are provided in the surfaces of said partitions.

2. A production process of a honeycomb structure comprising adding binder and water to cordierite raw material and kneading, followed by extruding, drying and firing to produce a honeycomb structure in which partitions are provided in the form of honeycombs having for their main ingredient cordierite chemically composed of 45–55 wt % $SiO_2$, 33–42 WT % $Al_2O_3$ and 18 wt % MgO wherein the above mentioned cordierite raw material contains 5–15 parts by weight per 100 parts by weight of the cordierite raw material of combustible particles having a particle size of 1–5 $\mu$m, such that fifty or more pores (number/1.65 $mm^2$) having a mean diameter of 1–20 $\mu$m are provided in the surface of said partitions.

3. A production process of a honeycomb structure as set forth in claim 2 wherein said combustible particles are carbon particles.

* * * * *